May 26, 1959  A. G. SCHILBERG  2,888,110
BRAKE BEAM AND HEAD ASSEMBLY
Filed April 5, 1954
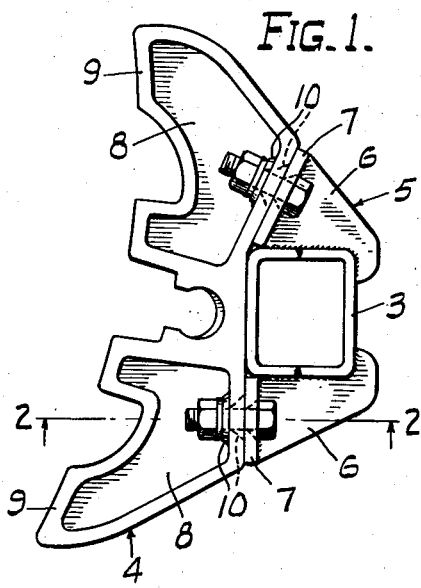
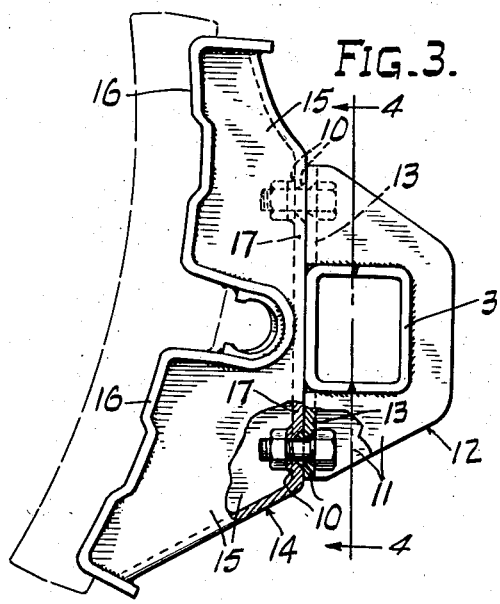
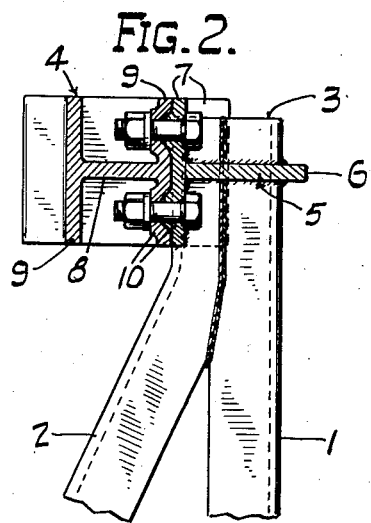
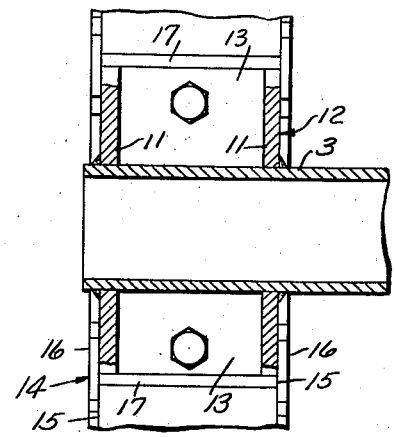
INVENTOR.
Arnold G. Schilberg
BY
ATTORNEYS.

United States Patent Office 2,888,110
Patented May 26, 1959

2,888,110

BRAKE BEAM AND HEAD ASSEMBLY

Arnold G. Schilberg, Milwaukee, Wis., assignor to A. O. Smith Corporation, Milwaukee, Wis., a corporation of New York Application April 5, 1954, Serial No. 421,064

6 Claims. (Cl. 188—219.6)

This invention relates to brake beam and head assembly for railway cars and the like, and more particularly to a replaceable brake head.

The principal object of the invention is to provide a brake beam and head assembly wherein only a part of each brake head need be replaced in service thereby effecting a cost and material saving in replacement.

The invention is directed to a brake head and beam assembly wherein a replaceable brake head is provided which is secured by bolts or otherwise to an attaching bracket affixed to an end of a brake beam. The head and bracket members may be either weldments or castings.

Other objects of the invention will become apparent from the following description of an embodiment of the invention illustrating several embodiments of the invention.

In the drawing:

Figure 1 is a side elevation of the brake head as attached to the beam;

Fig. 2 is a sectional view taken on line 2—2 of Figure 1 showing an end portion;

Fig. 3 is a view similar to Figure 1, partially in section showing another embodiment of the invention; and Fig. 4 is a view taken on line 4—4 of Fig. 3.

In the drawing there is shown a brake beam comprising a compression member 1 and a tension member 2, both of channel cross section, which are joined at their ends by welding or otherwise to form a generally box-shaped section indicated at 3. However, the box-shaped section is not essential to the invention, and end 3 might assume any configuration desired.

The brake head and the bracket by which the head is secured to beam end 3 under the invention may assume a variety of configurations as seen in the drawing.

The brake head 4 shown in Figure 1 is attached to the bracket 5 comprised of two parts providing webs 6 which are welded to opposite sides of beam end 3. Each web 6 is provided with a flange 7 normal thereto and the respective flanges 7 of the two parts of the bracket are disposed angularly to each other and are provided with suitable holes therethrough to each side of web 6 to receive bolts or rivets for attachment of the replaceable head 4 to the bracket.

The replaceable head 4 shown in Figure 1 comprises a web 8 that lies in the same plane as webs 6 of bracket 5. The periphery of web 8 is surrounded by a flange 9 disposed normally to the web. The flange 9 is configured along its outer edge to receive a brake shoe, not shown, and along its inner edge flange 9 complements flanges 7 of bracket 5 and the side of the brake beam end 3 against which it abuts. Flange 9 has bolt holes along its inner side in alignment with holes provided in flanges 7 of the bracket 5. Bolts, as shown, or rivets may be disposed through the aligned holes in flanges 7 and 9 to removably secure the head 4 to the beam end 3. To assist the bolts or rivets in shear and for ease of alignment of head and bracket members, the holes may be embossed as shown at 10.

The embodiment of the invention shown in Fig. 3 has bracket and head members composed of laterally spaced webs with a flange extending therebetween. The spaced webs 11 of bracket 12 extend around three sides of the brake beam end 3 and are preferably secured to the beam end by welding, as shown. Flanges 13 extend along one side of the spaced webs 11 and are generally flush with beam end 3.

The replaceable brake head 14 is comprised of laterally spaced webs 15 generally aligned with webs 11 of bracket 12. A flange 16 is disposed across the spaced webs 15 at the outer side thereof and is shaped to receive a brake shoe, shown in dashed lines. A flange 17 extends on the inner side of webs 15 complementary to the flange 13 of bracket 12. Flanges 17 and 13 are provided with aligned holes centrally of their respective webs to receive bolts for joining the bracket and head together. The aligned holes are embossed to assist the bolts in resisting shear loads in service and to aid in the alignment of members 12 and 14. Grommets are secured to the embossed flange 17 in axial alignment with the holes for receiving the bolts to secure the head and bracket together.

The replaceable brake head herein described is readily replaced in the field with a minimum of tools. Because only a part of the head need be replaced when worn or broken, a saving of material is effected. Other savings are also effected in that it is unnecessary to remove the beam from its securement or to remove other parts from the beam to make the replacement.

Various modes of carrying out the invention are contemplated as within the scope of the following claims particularly pointing out and distinctly claiming the subject matter which is regarded as the invention.

I claim:

1. In a railway car brake beam and brake head assembly, a brake beam having a leading surface, a bracket fixedly attached to the beam end portion and including a pair of spaced webs with a flange extending therebetween and normal thereto, said flange being generally in line with the leading surface of the beam end forming therewith a securing surface and having holes disposed on either side of the beam, a brake head adapted to carry a brake shoe, said head being comprised of spaced webs and a flange disposed normal to the webs and complementary to the flange of the bracket and the leading surface of the beam and being provided with holes aligned with the holes of the bracket flange, embossments formed on the flanges of the head and bracket bordering the aligned holes, and threaded means extending through the aligned embossed holes to removably secure the members together, said embossments assisting said threaded means to resist shear forces in service.

2. In a railway car brake beam and brake head assembly, a brake beam having a leading surface, bracket means comprised of flanged web sections fixedly secured to the vertically spaced surfaces of the end portion of said beam, said flanges being disposed on the leading side of said sections and normal to said webs and being provided with holes disposed to each side of said webs, the flanges being further disposed angularly to each other and together with the leading surface of the beam forming a securing surface, a head member adapted to carry a brake shoe, said head member comprised of a web having a flange on the trailing side thereof and normal to the flange, the flange of said head member complementing the flange of the bracket means and the leading surface of the beam and being provided with holes aligned with the holes in the flanges of the bracket means, and threaded means extending through the aligned holes to removably secure the head member and bracket means together, said angularly disposed securing surface of the bracket means and complementary surface of the head member assisting said threaded means to resist shear forces in service.

3. In a railway car brake beam and brake head assembly, a brake beam having a box-shaped end portion, bracket means fixedly secured to the box-shaped end portion adjacent the end of the beam and together with the leading surface of the beam providing a substantially continuous attachment surface, a brake head adapted to carry a brake shoe forwardly with said head being provided with a complementary attachment surface rearwardly for engaging the bracket means and leading surface of the beam, and means for removably securing the head to the bracket means.

4. In a railway car brake beam and brake head assembly, channel section compression and tension members joined together at the end portions thereof to form a brake beam having a box-shaped end portion with the web of the tension member providing the leading surface of the beam, bracket means fixedly secured to the box-shaped end portion adjacent the end of the beam and together with the leading surface of the beam providing a substantially continuous attachment surface, a brake head adapted to carry a brake shoe forwardly with said head being provided with a complementary attachment surface rearwardly for engaging the continuous attachment surface formed by the bracket member and beam, connecting members extending through aligned openings in the complementary attachment surfaces to removably secure the brake head to the bracket means, and embossments formed on the complementary attachment surfaces at the aligned openings for assisting the connecting members to resist shear forces in service.

5. In a railway car brake beam and brake head assembly, a brake beam having a leading surface, bracket means fixedly secured to the beam adjacent the end thereof and together with the leading surface of the beam providing a substantially continuous attachment surface, a brake head adapted to carry a brake shoe forwardly thereof and being provided with a complementary attachment surface rearwardly thereof for engaging the bracket means and leading surface of the beam, and means for removably securing the head to the bracket means.

6. In a railway car brake beam and brake head assembly, a brake beam having a leading surface, bracket means fixedly secured to the beam adjacent the end thereof and provided forwardly with transversely extending surfaces disposed angularly to each other, said transverse surfaces together with the leading surface of the beam providing a substantially continuous angulated attachment surface, a brake head adapted to carry a brake shoe forwardly thereof and being provided with a complementary attachment surface rearwardly thereof for engaging the bracket means and leading surface of the beam, and means for removably securing the head to the bracket means, said angulated attachment surfaces serving to assist the securement means in resisting transverse loads in service.

References Cited in the file of this patent

UNITED STATES PATENTS

| 23,722 | Stevens | Apr. 19, 1859 |
| 701,220 | Odgers | May 27, 1902 |
| 733,516 | Swanson | July 14, 1903 |
| 794,404 | Green | July 11, 1905 |
| 1,363,189 | Mulroney | Dec. 21, 1920 |
| 2,493,239 | Ekholm | Jan. 3, 1950 |
| 2,755,892 | Sherman | July 24, 1956 |

FOREIGN PATENTS

| 454,976 | Canada | Mar. 8, 1949 |